April 3, 1962  V. MASTIS  3,028,139

DRAIN VALVE

Filed Oct. 17, 1958

INVENTOR.
Victor Mastis,
BY Parker & Carter
Attorneys.

United States Patent Office 3,028,139
Patented Apr. 3, 1962

3,028,139
DRAIN VALVE
Victor Mastis, Chicago, Ill., assignor to Berg Airlectro Products Co., Chicago, Ill., a corporation of Illinois
Filed Oct. 17, 1958, Ser. No. 767,818
3 Claims. (Cl. 251—175)

This invention relates to drain valves for reservoirs and the like and has for one purpose to provide a positively-acting drain valve for reservoirs containing air under pressure.

Another purpose is to provide a drain valve for containers having air under pressure wherein the pressure of the air aids in the sealing of said valve against unintended loss of air.

Another purpose is to provide a valve having a valve member provided with a sealing skirt.

Another purpose is to provide a valve having a valve piston formed of flexible material and provided with a sealing skirt.

Another purpose is to provide a valve piston having conformations therein providing a flexible sealing skirt and a seat for a yielding member.

Another purpose is to provide a piston element having a conformation thereon providing a flexible sealing portion and seat and positioning means for a yielding member.

Another purpose is to provide a drain valve having a valve member manually operable in one direction and automatically operable in the other.

Other purposes will appear from time to time in the course of the specification and claims.

I illustrate my invention more or less diagrammatically in the accompanying drawings wherein.

Like parts are indicated by like numerals throughout the specification and drawing.

Figure 1:
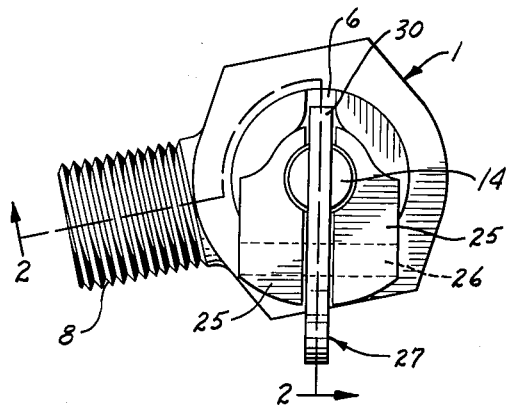
FIGURE 1 is an end view of my valve.
Figure 2:
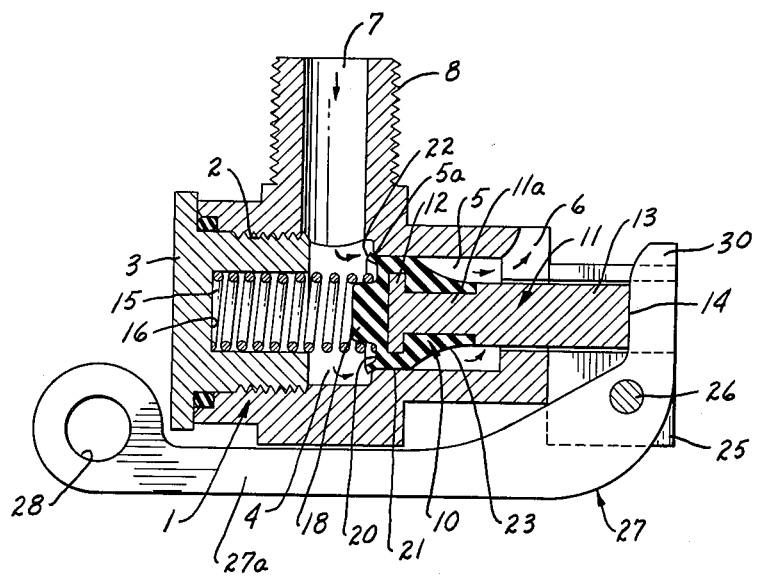
FIGURE 2 is a section taken on the line 2—2 in FIGURE 1.

Referring now to the drawings and particularly to FIGURE 2, the numeral 1 indicates generally a valve housing. The housing 1 has at one end thereof a threaded opening 2 in which is positioned an end cap or closure 3. The opening 2 continues into the housing to form an inlet chamber 4. A valve chamber 5 communicates with the chamber 4 and an outlet aperture 6, communicating with chamber 5, is formed in the end of the housing opposite from that closed by the cap 3. The corner or circular edge formed at the juncture of chamber 4 and smaller chamber 5 is rounded as indicated at 5a. An inlet passage 7 is provided in a side wall of the housing and communicates with the chamber 4. Threads 8 may be formed on the outer surface of the wall forming the inlet passage 7 to provide for attachment of the housing 1 to, for example, an air pressure reservoir.

Reciprocal within the chamber 5, which is of reduced diameter from that of chamber 4, is a valve member 10. The valve member 10 may be formed of rubber or other flexible material having substantially the properties of rubber and may have embedded therein a plunger stem 11. The stem 11 has at its embedded end an enlarged annular flange or head 12. The stem 11 has an enlarged rear portion 13 which extends from the reduced portion 11a through the opening 6 a substantial distance to provide an external, operable end surface 14.

A yielding member, such as the coil spring 15, seats at one end within a well 16 formed in the cap 3 and open to the chamber 4. The opposite end of the spring 15 surrounds a spring-positioning enlargement or post 18 on the member 10 and seats within an annular groove 20 formed in the outer end face of the member 10 and surrounding the enlargement 18.

The member 10 has a cylindrical portion 21 adapted for sliding engagement with the inner wall of the chamber 5 and terminating at one end in a flexible skirt 22 surrounding and defining the annular groove 20. From the cylindrical surface 21 the member 10 has a curvedly reduced portion 23 which surrounds the stem portion 11a and terminates in abutting relationship with the inner end surface of the stem portion 13.

A bracket 25 pivotally supports, as at 26, a manually operable handle 27. The handle 27 may have an eye 28 formed at one end thereof for attachment of a suitable operating means and has an operating end 30 positioned to engage the outer end surface 14 on stem portion 13. As best seen in FIGURE 2, the spring 15 is effective to hold the portions 30, 13 in contact, one with the other. Handle portion 27a extends perpendicularly from portion 30 and is held against further rotation in clockwise direction by housing 1 or a connection at 28 or by any suitable means.

Although an operative form of the device has been shown, the invention is not limited to the particular details shown. Many changes may be made in the form, shape and arrangement of parts without departing from the spirit of the invention. I therefore wish to be limited only by the claims appended hereto.

The use and operation of my invention are as follows:

The housing 1 is secured to a supply of air under pressure, for example, to an air pressure reservoir, thus placing the passage 7 in communication with the air within the reservoir. The air, under pressure, thereby is present in the passage 7 and in the chamber 4.

The spring 15 is normally effective to hold the parts in the position shown in FIGURE 2. The corner formed by the end wall defining one end of the chamber 4 and the inner open end of chamber 5 is rounded as indicated at 5a.

The skirt 22 is held in position immediately adjacent the rounded corner 5a and with a small portion of the skirt extending into chamber 4, by the arrangement of the handle 27 and portion 30 thereof, the perpendicularly disposed handle segment 27a being prevented from rotation and thus preventing rotation of portion 30 in response to spring 15. With the flexible skirt 22 thus positioned, the air pressure in chamber 4 is effective to flex the skirt outwardly against the rounded surface and thus to seal, even more effectively, the drain valve structure against the loss of air.

When it is desired to actuate the drain valve the handle portion 27a may be rotated counter-clockwise about its pivot 26 to cause portion 30 to move the stem 11 inwardly. The stem carries with it the piston or valve member 10 and moves it toward and partially into chamber 4 against the action of spring 15. When the member 10 is moved a sufficient distance toward chamber 4 a sufficient leak or space occurs between the outer surface of the cylindrical portion 21 to permit the air under pressure in chamber 4 to pass into chamber 5 and from chamber 5 through outlet passage 6 to atmosphere.

I claim:

1. A drain valve comprising a housing, a pressure chamber in said housing, an inlet in said chamber adapted for communication with a source of fluid under pressure, an outlet in said chamber for said pressurized fluid to escape therethrough, an annular rounded surface in said chamber between said inlet and said outlet, a valve member movable in said chamber between a first position wherein said inlet is sealed off from said outlet and a second position wherein said inlet and said outlet are in communication, said valve member including a portion formed of resilient material and having a circumferential outer surface engaging the wall of said chamber when said valve member is in said first position, said portion terminating in a relatively thin, annular flexible skirt extending axially of said chamber towards said inlet and adapted to be folded outwardly against said annular rounded surface by the pressure of said fluid when said member is in said first position, said skirt having a normal outer diameter equal to that of said valve member portion.

2. In a valve housing a pressure chamber, an inlet for air under pressure in communication with said chamber, a valve chamber communicating with said pressure chamber, a valve piston formed of flexible material and mounted for reciprocation in said valve chamber, said piston having a circumferential outer wall surface positioned for contact with the wall of said valve chamber, a metal stem imbedded in said valve piston and having a portion extending through a wall of said housing, yielding means in said pressure chamber and seated against said valve piston tending to bias said valve piston into a position sealing off said valve chamber from said pressure chamber, a rounded annular surface in said housing defining the point of communication between said pressure chamber and said valve chamber, said valve piston having a flexible annular skirt extending toward and partially into said pressure chamber when said valve is in said first position, said skirt having a circumferential outer wall surface constituting a continuation of said piston outer wall surface and having a normal diameter identical therewith, said flexible skirt adapted to be folded outwardly against said annular rounded surface by the pressure of said air when said piston is in said first position, and means for moving said metal stem so as to move said valve piston out of said first position against the bias of said resilient means to permit communication between said pressure chamber and said valve chamber.

3. A drain valve comprising a housing having an axially disposed bore therein, one end of said bore having an enlarged diameter and forming a pressure chamber, the other end of said bore having a somewhat smaller diameter and forming a valve chamber, a ledge having a rounded annular edge in said bore defining the point of communication between said pressure chamber and said valve chamber, a fluid pressure inlet port in said housing extending transversely of said bore and having communication with said pressure chamber, a fluid outlet port in said housing having communication with said valve chamber, a valve piston formed of flexible material slidable in said valve chamber between a first position wherein said inlet port is sealed off from said outlet port and a second position wherein said inlet and outlet ports are in communication, said valve piston having a circumferential outer surface positioned for contact with the wall of said valve chamber, said valve piston having a relatively thin annular flexible skirt extending axially of said bore towards said pressure chamber and adapted to be folded outwardly against said annular rounded edge by the pressure of said fluid when said piston is in said first position, said skirt having a circumferential outer surface constituting a continuation of said piston outer surface and normally of equal diameter therewith, an annular groove in said valve piston within said skirt and concentric therewith, resilient means in said fluid pressure chamber seated in said groove and biasing said valve piston toward said first position, a valve stem imbedded in said valve piston and extending outwardly of said housing and means pivoted on said housing and adapted to bear against said valve stem to exert pressure against said resilient means and move said valve piston into said second position.

References Cited in the file of this patent
UNITED STATES PATENTS

| | | |
|---|---|---|
| 2,397,269 | Kelly | Mar. 26, 1946 |
| 2,578,797 | Gordinier | Dec. 18, 1951 |
| 2,813,569 | Nelson | Nov. 19, 1957 |
| 2,821,356 | Rand | Jan. 28, 1958 |